United States Patent
Bakshi et al.

(10) Patent No.: US 12,135,638 B2
(45) Date of Patent: Nov. 5, 2024

(54) GRAPHICAL NEURAL NETWORK FOR ERROR IDENTIFICATION

(71) Applicant: Bank of America Corporation, Charlotte, NC (US)

(72) Inventors: Sakshi Bakshi, New Delhi (IN); Srinivasa Dhanwada, Hyderabad (IN); Sathya Thamilarasan, Tamilnadu (IN); Siva Paini, Telangana (IN); Shyamala Manoharan, Chennai (IN); Nagalaxmi Sama, Telangana (IN); Sri Lakshmi Priya Doraiswamy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/972,791

(22) Filed: Oct. 25, 2022

(65) Prior Publication Data
US 2024/0134777 A1   Apr. 25, 2024
US 2024/0232054 A9   Jul. 11, 2024

(51) Int. Cl.
G06F 11/36 (2006.01)
G06F 11/34 (2006.01)

(52) U.S. Cl.
CPC ...... G06F 11/3668 (2013.01); G06F 11/3457 (2013.01)

(58) Field of Classification Search
CPC .................................................. G06F 11/3668
See application file for complete search history.

(56) References Cited

U.S. PATENT DOCUMENTS

| | | | |
|---|---|---|---|
| 7,571,154 B2 * | 8/2009 | Emeis | G06F 9/5044 709/203 |
| 7,801,896 B2 | 9/2010 | Szabo | |
| 8,935,275 B2 | 1/2015 | Rathod | |
| 10,747,733 B2 * | 8/2020 | Rowley | H04L 41/22 |
| 10,949,338 B1 | 3/2021 | Sirianni et al. | |
| 11,126,635 B2 | 9/2021 | Behzadi et al. | |
| 11,184,233 B1 | 11/2021 | Neelakantam et al. | |
| 2006/0235855 A1 | 10/2006 | Rousseau et al. | |

(Continued)

OTHER PUBLICATIONS

May 1, 2024—(US) Notice of Allowance—U.S. Appl. No. 17/972,711.

*Primary Examiner* — Jae U Jeon
(74) *Attorney, Agent, or Firm* — Banner & Witcoff, Ltd.

(57) ABSTRACT

Aspects of the disclosure relate to upgrading an application within a simulated version of an enterprise system to detect and correct potential errors as a result of the upgrade. A computing platform may create a simulated version of the enterprise system by receiving metadata associated with the enterprise system, and converting the metadata into system parameters. Virtual parameters may be created by the computing system based on upgrading an application within the simulated version of the enterprise system. The computing system may create system nodes and virtual nodes. The system nodes and virtual nodes may be dynamically linked in order to determine errors caused by the application upgrade within the simulated version of the enterprise system. The computing platform may determine actions to correct the errors and input the results and feedback into an AI engine to further refine the accuracy and reliability of the computing platform over time.

20 Claims, 12 Drawing Sheets

(56) References Cited

U.S. PATENT DOCUMENTS

| | | | |
|---|---|---|---|
| 2007/0011485 A1* | 1/2007 | Oberlin | G06F 9/5072 |
| | | | 714/4.1 |
| 2007/0233782 A1 | 10/2007 | Tali | |
| 2009/0288064 A1 | 11/2009 | Yen et al. | |
| 2012/0257496 A1* | 10/2012 | Lattmann | H04L 45/125 |
| | | | 370/229 |
| 2014/0068045 A1* | 3/2014 | Tarui | H04L 41/02 |
| | | | 709/223 |
| 2014/0086399 A1 | 3/2014 | Haserodt et al. | |
| 2017/0078152 A1* | 3/2017 | Ahmed | H04L 41/12 |
| 2017/0192873 A1 | 7/2017 | Ozdemir et al. | |
| 2019/0079734 A1 | 3/2019 | Kadam et al. | |
| 2019/0325341 A1 | 10/2019 | Kakhandiki et al. | |
| 2019/0325364 A1 | 10/2019 | Rajagopalan et al. | |
| 2020/0059377 A1 | 2/2020 | Ansari et al. | |
| 2020/0159525 A1 | 5/2020 | Bhalla et al. | |
| 2020/0218452 A1 | 7/2020 | Niven et al. | |
| 2020/0264860 A1 | 8/2020 | Srinivasan et al. | |
| 2021/0124672 A1 | 4/2021 | Abdelhalim et al. | |
| 2021/0241168 A1 | 8/2021 | Sarferaz | |
| 2022/0027142 A1 | 1/2022 | Huth et al. | |
| 2022/0147336 A1 | 5/2022 | Joshi et al. | |
| 2022/0180215 A1 | 6/2022 | Kumar | |
| 2022/0391312 A1 | 12/2022 | Sharma et al. | |
| 2023/0305886 A1 | 9/2023 | Devulapalli et al. | |

* cited by examiner

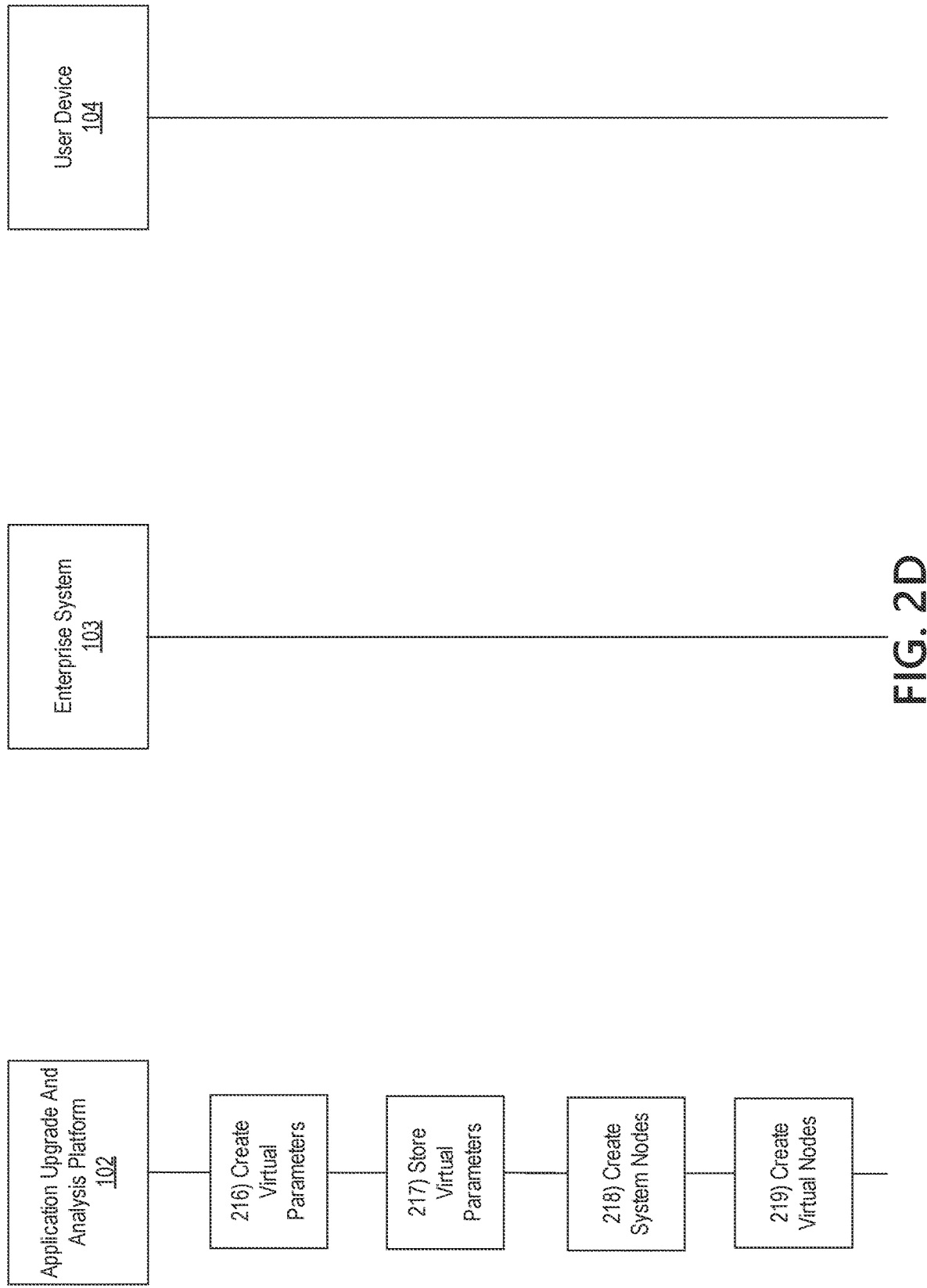

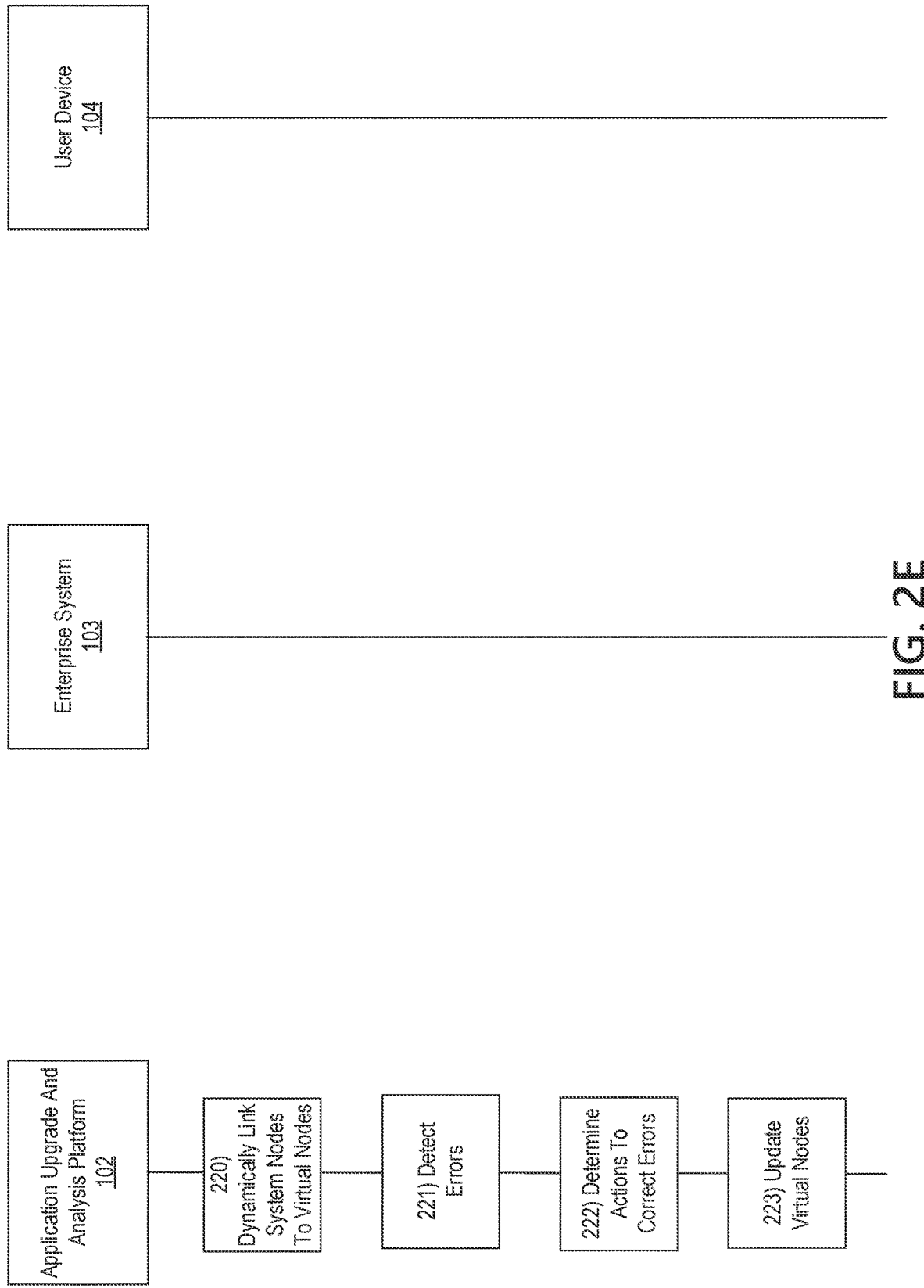

Actions to Correct Identified Errors

An error has been detected:

"Error #1"

An action to correct the error has been proposed:

"Action #1"

An error has been detected:

"Error #2"

An action to correct the error has been proposed:

"Action #2"

FIG. 5

Results of Error Correction

"Error #1" was corrected by "Action #1"

"Error #2" was corrected by "Action #2"

FIG. 6

GRAPHICAL NEURAL NETWORK FOR ERROR IDENTIFICATION

BACKGROUND

Aspects of the disclosure relate to detecting and correcting errors as a result of an application upgrade. When an application is upgraded within a larger computing system, errors may be unknowingly introduced in the application or within the computing system. Errors may be due to, for example, an incorrect library version in the upgraded application. These errors may be detected and corrected by reviewing the upgraded application and/or the computing system. However, this process may be inefficient and time intensive, which may result in errors remaining undetected and uncorrected, thus negatively impacting the application and the computing system. Accordingly, it may be advantageous to identify efficient and accurate methods for analyzing and correcting errors when upgrading an application.

SUMMARY

Aspects of the disclosure provide effective, efficient, scalable, and convenient solutions that address and overcome the technical problems associated detecting and correcting errors as a result of an application upgrade. In accordance with one or more aspects of the disclosure, a computing platform comprising at least one processor, a communication interface communicatively coupled to the at least one processor, and memory storing computer-readable instructions may receive system parameters of an enterprise system that represent characteristics of the enterprise system and virtual parameters of a simulated enterprise system in which an application has been upgraded, that represent characteristics of the simulated enterprise system and correspond to the system parameters. In some examples, each virtual parameter may represent a characteristic of the simulated enterprise system that corresponds to a system parameter that represents a corresponding characteristic of the enterprise system, and differences between values of the virtual parameters and values of the corresponding system parameters represent differences between the characteristics of the simulated enterprise system and the corresponding characteristics of the enterprise system. The computing platform may store, in a graphical database, the system parameters and the virtual parameters. The computing platform may create system nodes based on the system parameters and virtual nodes based on the virtual parameters, where the system nodes are linked together based on relationships between the system parameters, and the virtual nodes are linked together based on relationships between the virtual parameters. The computing platform may dynamically link the system nodes to the virtual nodes based on the correspondence between the system parameters and the virtual parameters. The computing platform may detect, based on the dynamic linking between the system nodes and the virtual nodes, at least one error, wherein detecting the at least one error comprises identifying that at least one dynamic link indicates a discrepancy between a system node and a corresponding virtual node. The computing platform may output the at least one error to an AI engine to determine at least one action to correct the at least one error. The computing platform may modify the graphical database by updating the virtual nodes based on the at least one action to correct the at least one error. The computing platform may dynamically link the system nodes to the updated virtual nodes. The computing platform may determine whether the at least one action corrected the at least one error based on the dynamic linking of the system nodes to the updated virtual nodes. The computing platform may, based on identifying that the at least one action corrected the at least one error, send one or more commands directing the enterprise system to upgrade the application within the enterprise system and execute the at least one action to correct the at least one error on the enterprise system, where sending the one or more commands causes the enterprise system to upgrade the application and execute the at least one action to correct the at least one error.

In one or more instances, the computing platform may store, in the graphical database, the system nodes, the virtual nodes, the updated virtual nodes, the dynamic links between the system nodes and virtual nodes, and the dynamic links between the system nodes and the updated virtual nodes.

In one or more examples, the computing system may include a first system node that is an application-to-be-upgraded node and a first virtual node is a corresponding virtual upgraded application node, a second system node is a performance node and a second virtual node is a corresponding virtual performance node, a third system node is a memory node and a third virtual node is a corresponding virtual memory node, and a fourth system node is a central processing unit (CPU) utilization node and a fourth virtual node is a corresponding virtual CPU utilization node.

In one or more instances, the computing platform may include a first dynamic link that may be a link between the application-to-be-upgraded node and the corresponding virtual upgraded application node, a second dynamic link that may be a link between the performance node and the corresponding virtual performance node, a third dynamic link that may be a link between the memory node and the corresponding virtual memory node, and a fourth dynamic link that may be a link between the CPU node and the corresponding virtual CPU node.

In one or more examples, the computing platform may generate, using the graphical database, a graphical representation of the system nodes and the updated virtual nodes, and the dynamic linking of the system nodes to the updated virtual nodes. The computing platform may output, to the AI engine, the graphical representation and an indication of whether or not the at least one action corrected the at least one error. In one or more instances, the computing platform may train the AI engine using the system nodes, the virtual nodes, the updated virtual nodes, the dynamic links between the system nodes and virtual nodes, the dynamic links between the system nodes and the updated virtual nodes, and the indication of whether or not the at least one action corrected the at least one error.

In one or more examples, the computing platform may store, in the AI engine, the at least one action to correct the at least one error, and the indication of whether or not the at least one action corrected the at least one error. In one or more instances, the computing platform may output, to the AI engine, based on identifying that the at least one action did not correct the at least one error, a notification that the at least one action did not correct the at least one error.

In one or more instances, the computing platform may send a report comprising the at least one error and the at least one action to correct the at least one error and one or more commands directing the user device to display the report, where sending the one or more commands directing the user device to display the report causes the user device to display the report.

In on ore more examples, the computing platform may monitor the enterprise system after the sending the one or more commands directing the enterprise system to upgrade the application within the enterprise system and execute the at least one action to correct the at least one error on the enterprise system. In one or more instances, the computing platform may include a real-time state of the enterprise system that is transmitted to the computing platform using a communication link.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing an AI supported graph enabled method to manage an application upgrade in accordance with one or more example embodiments;

FIGS. 5 and 6 depict illustrative graphical user interfaces for implementing an AI supported graph enabled method to manage an application upgrade in accordance with one or more example embodiments.

DETAILED DESCRIPTION

Figure 1A:
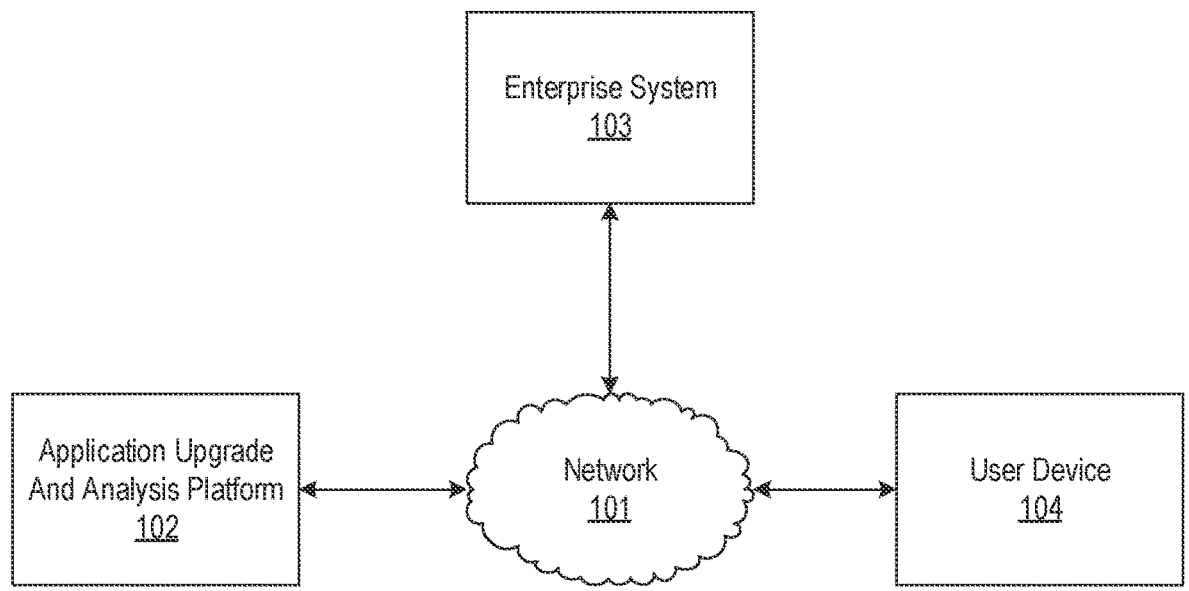
FIGS. 1A-1B depict an illustrative computing environment for implementing an AI supported graph enabled method to manage an application upgrade in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to managing an application within a computing system using an artificial intelligence (AI) supported graph enabled method. An application may include a computer software package that performs a specific function (e.g., word processors, database programs, web browsers, deployment tools, image editors, communication platforms, and the like). All applications may depend on specific versions of libraries of underlying software. During an upgrade of an application, a version of a library on which the application depends may change, which may cause the application to halt. Further, the change may also affect the larger computing system that the application is a part of, such as the performance of the system. Searching through the changed libraries and taking action to determine the issue separately would be an inefficient and time-consuming task. When an application is not functioning properly, it may be necessary to back trace and analyze the libraries that are impacted. It might not be possible to know that the libraries' versions are changed until they are manually reviewed.

Accordingly, described herein is an AI supported graph enabled system, which may be used to determine impacted libraries that may be corrected by an AI engine. Additionally, the graph enabled system may create an auto clone with parallel capture and tracking of machine parameters and performance of an application within a larger computing system. In some instances, the cloned virtual machines may run the current and upgraded versions, with the system and application performance and parameter changes being compared without disturbing the current setup. Additionally, the graph based system relationships may make the comparison and library selection in real-time. In some instances, the graph nodes may be replicated in the virtual system to track and compare the actual system performance and functioning with the original and replicated nodes linked together with dynamic replication relation-links.

Accordingly, the AI engine may comprise of complex neural networks that may trace the node differences on a real-time basis and suggest fixes to remediate identified errors. In some instances, hashgraph nodes may dynamically update based on remediation actions suggested to fix gaps and also provide libraries/package difference evaluation for analysis. The AI engine may further track any product fixes available in the market for better decision making in real-time mode and may also track other internal connected applications with similar setup to trace the fixes.

Figure 1B:
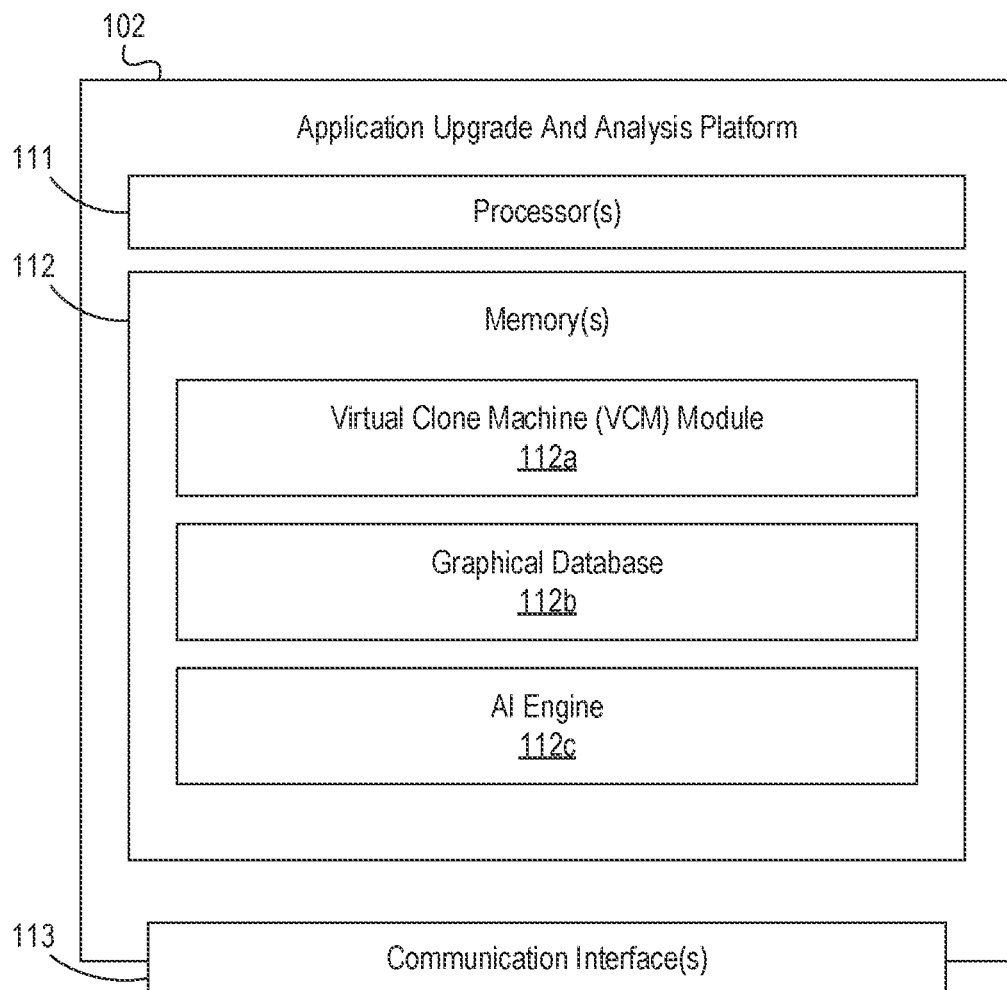

FIGS. 1A-1B depict an illustrative computing environment for implementing an AI supported graph enabled method to manage upgrades for applications in accordance with one or more example embodiments. Referring to FIG. 1A, computing environment 100 may include one or more computer systems. For example, computing environment 100 may include an application upgrade and analysis platform 102, an enterprise system 103, and user device 104.

As described further below, application upgrade and analysis platform 102 may be a computer system that includes one or more computing devices (e.g., servers, server blades, or the like) and/or other computer components (e.g., processors, memories, communication interfaces) that may be used to train, host, and/or otherwise refine an artificial intelligence (AI) engine, which may be used to detect and correct errors resulting from application upgrades within a simulated version of a computing system, such as enterprise system 103.

Enterprise system 103 may be a computer system that includes one or more computing devices (e.g., servers, server blades, a laptop computer, desktop computer, smartphone, smartwatch, tablet, and/or other device) and/or other computer components (e.g., processors, memories, communication interfaces). The enterprise system 103 may further collect, store, host, and otherwise run functions such as applications that a business may utilize in order to provide for a cross-functional system that provides organization-wide coordination and integration of key business processes that helps in planning the resources of an organization.

User device 104 may be a laptop computer, desktop computer, mobile device, tablet, smartphone, and/or other device, which may host, run, or otherwise request that an application be upgraded. In some instances, such upgrades may cause the application to contain errors, or cause errors to proliferate within enterprise system 103. In some instances, user device 104 may be a user computing device that is used by an individual. In some instances, user device 104 may be an enterprise computing device that is used by an administrator to host, run, or otherwise execute an application on the user device 104. In some instances, user device 104 may be configured to display one or more user interfaces (e.g., interfaces depicting a notification that an error has been automatically corrected, or the like). Although only a single user device 104 is depicted, this is for illustrative purposes only, and any number of user devices may be implemented in the environment 100 without departing from the scope of the disclosure.

Computing environment 100 also may include one or more networks, which may interconnect application upgrade and analysis platform 102, enterprise system 103, and user device 104. For example, computing environment 100 may include a network 101 (which may interconnect, e.g., application upgrade and analysis platform 102, enterprise system 103, and user device 104).

In one or more arrangements, application upgrade and analysis platform 102, enterprise system 103, and user device 104 may be any type of computing device capable of sending and/or receiving requests and processing the requests accordingly. For example, application upgrade and analysis platform 102, enterprise system 103, and user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of application upgrade and analysis platform 102, enterprise system 103, and user device 104 may, in some instances, be special-purpose computing devices configured to perform specific functions.

Referring to FIG. 1B, application upgrade and analysis platform 102 may include one or more processors 111, memory 112, and communication interface 113. A data bus may interconnect processor 111, memory 112, and communication interface 113. Communication interface 113 may be a network interface configured to support communication between application upgrade and analysis platform 102 and one or more networks (e.g., network 101, or the like). Memory 112 may include one or more program modules having instructions that when executed by processor 111 cause application upgrade and analysis platform 102 to perform one or more functions described herein and/or one or more databases that may store and/or otherwise maintain information which may be used by such program modules and/or processor 111. In some instances, the one or more program modules and/or databases may be stored by and/or maintained in different memory units of application upgrade and analysis platform 102 and/or by different computing devices that may form and/or otherwise make up application upgrade and analysis platform 102. For example, memory 112 may have, host, store, and/or include virtual clone machine (VCM) module 112a, graphical database 112b, and/or AI engine 112c.

VCM module 112a may have instructions that direct and/or cause application upgrade and analysis platform 102 to upgrade an application within a simulated version of the enterprise system 103 in order to detect and correct potential errors as a result of the application upgrade, as discussed in greater detail below. Graphical database 112b may store information used by the VCM module 112a and/or application upgrade and analysis platform 102 in the graphical representation of a simulated version of the enterprise system 103 in which an application has been upgraded (e.g., in order to detect any potential errors associated with the application upgrade), and/or in performing other functions. AI Engine 112c may be used by application upgrade and analysis platform 102 and/or VCM module 112a to determine actions to correct errors that were identified by the graphical database 112b, and to refine and/or otherwise update methods for determining actions to correct errors that have been identified by the graphical database 112b, and/or other methods described herein.

Figure 2A:
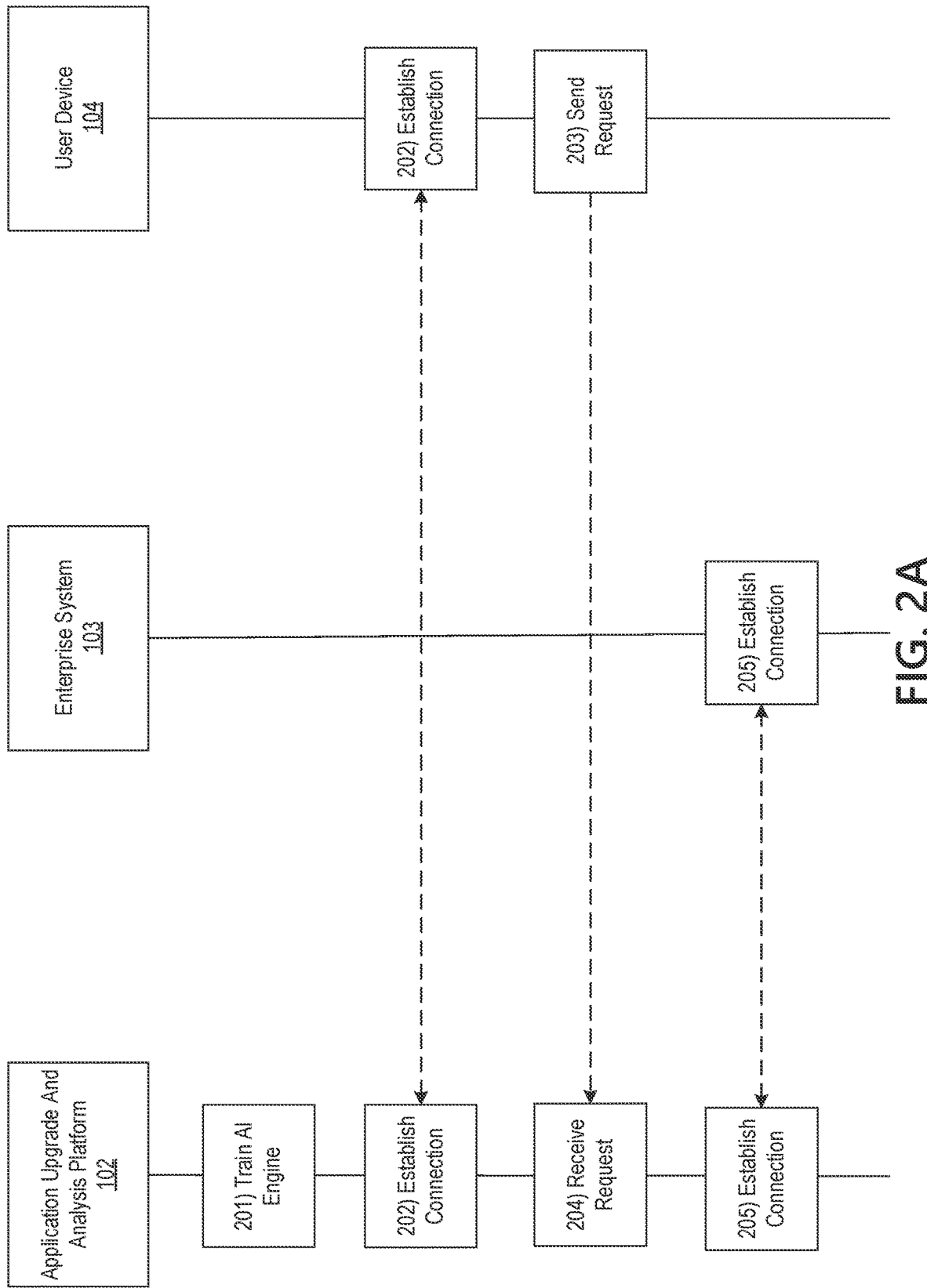

FIGS. 2A-2G depict an illustrative event sequence for implementing an AI supported graph enabled method to manage upgrades for applications in accordance with one or more example embodiments. Referring to FIG. 2A, at step 201, the application upgrade and analysis platform 102 may train and/or otherwise configure an AI engine, using historical information, to identify actions to correct previously identified errors based on an application that has been upgraded (or otherwise updated) within a simulated version of the enterprise system 103. In some instances, the application upgrade and analysis platform 102 may collect historical information for the detection and correction of errors in a plurality of applications across a plurality of computing devices (which may, e.g., include the enterprise system 103 and user device 104). In some instances, the historical information may include previous errors and corresponding actions that successfully corrected the previous errors, previous errors and corresponding actions that unsuccessfully corrected the previous errors, and/or other information. For example, if a previous error was a missing library that caused an application to function improperly, and the action that successfully corrected the error was installing the missing library, then the historical information may be used to determine the same or similar action for a future error that is the same or similar to the previous error. In some instances, the historical information may include information related to the enterprise system 103, which is discussed further below.

In some instances, the AI engine may utilize supervised learning, in which labeled data sets may be input into the AI engine (e.g., information including errors, actions corresponding to the errors, the level of confidence that a given action may successfully correct an error, information related to the enterprise system 103, and the like), which may be used to classify information and accurately predict outcomes with respect to error detection and correction. Using labeled inputs and outputs, the AI engine may measure its accuracy and learn over time. For example, supervised learning techniques such as linear regression, classification, neural networking, and/or other supervised learning techniques may be used.

Additionally or alternatively, the AI engine may utilize unsupervised learning, in which unlabeled data may be input into the AI engine. For example, unsupervised learning techniques such as k-means, gaussian mixture models, frequent pattern growth, and/or other unsupervised learning techniques may be used. In some instances, the AI engine may be a combination of supervised and unsupervised learning. In doing so, the application upgrade and analysis platform 102 may dynamically and continuously update and/or otherwise refine the AI engine so as to increase accuracy of the AI engine over time.

Although step 201 is described with regard to historical information, the application upgrade and analysis platform 102 may, in some instances, additionally or alternatively use real-time information (similar to the historical information) at any point throughout the illustrative event sequence without departing from the scope of the disclosure. For example, real-time information may be sent from one or more data sources, which may, e.g., include user computing devices, and/or other data sources.

At step 202, the user device 104 may establish a connection with the application upgrade and analysis platform 102. For example, the user device 104 may establish a first wireless data connection with the application upgrade and analysis platform 102 to link the user device 104 to the application upgrade and analysis platform 102 (e.g., in preparation for sending a request to upgrade an application). In some instances, the user device 104 may identify whether or not a connection is established with the application upgrade and analysis platform 102. If a connection is already established with the application upgrade and analysis platform 102, the user device 104 might not re-establish the connection. If a connection is not yet established with the application upgrade and analysis platform 102, the user device 104 may establish the first wireless data connection as described herein.

At step 203, the user device 104 may send a request to upgrade an application to the application upgrade and analysis platform 102. For example, the user device 104 may send the request to upgrade an application to the application upgrade and analysis platform 102 while the first wireless data connection is established. The request to upgrade an application may include information that, when received by the application upgrade and analysis correction platform 102, may identify the particular application to be upgraded.

At step 204, the application upgrade and analysis platform 102 may receive the request to upgrade an application. In some instances, the application upgrade and analysis platform 102 may receive the application upgrade request via the communication interface 113 and while the first wireless data connection is established. In some instances, (e.g., if the application is stored locally on the user device 104) the request may include a copy of the application. In some instances, the application upgrade and analysis platform 102 may, in response to receiving the request, send one or more commands to the user device 104, directing the user device 104 to transfer a copy of the application from the user device 104 to the application upgrade and analysis platform 102. In some instances, a copy of the application may be stored on the application upgrade and analysis platform 102. In some examples, the request may contain a location in which the application upgrade and analysis platform 102 may access the application. In some arrangements, the application may be stored on the enterprise system 103, and the application upgrade and analysis platform 102 may, in response to receiving the request, send one or more commands to the enterprise system 103, directing the enterprise system 103 to transfer a copy of the application from the enterprise system 103 to the application upgrade and analysis platform 102.

Although the transmission and receipt of the application upgrade request and other information are described at steps 203 and 204, additional information may also be sent to and/or received by the application upgrade and analysis platform 102 without departing from the scope of the disclosure (e.g., a request to upgrade a plurality of applications rather than a single application). In some instances, information may be sent by the user device 104, enterprise system 103, and/or one or more other computing devices.

At step 205, the application upgrade and analysis platform 102 may establish a connection with the enterprise system 103. For example, the enterprise system 103 may establish a second wireless data connection with the application upgrade and analysis platform 102 to link the enterprise system 103 to the application upgrade and analysis platform 102 (e.g., in preparation for sending a real-time feed of the enterprise system 103). In some instances, the enterprise system 103 may identify whether or not a connection is established with the application upgrade and analysis platform 102. If a connection is already established with the application upgrade and analysis platform 102, the enterprise system 103 might not re-establish the connection. If a connection is not yet established with the application upgrade and analysis platform 102, the enterprise system 103 may establish the second wireless data connection as described herein.

Figure 2B:
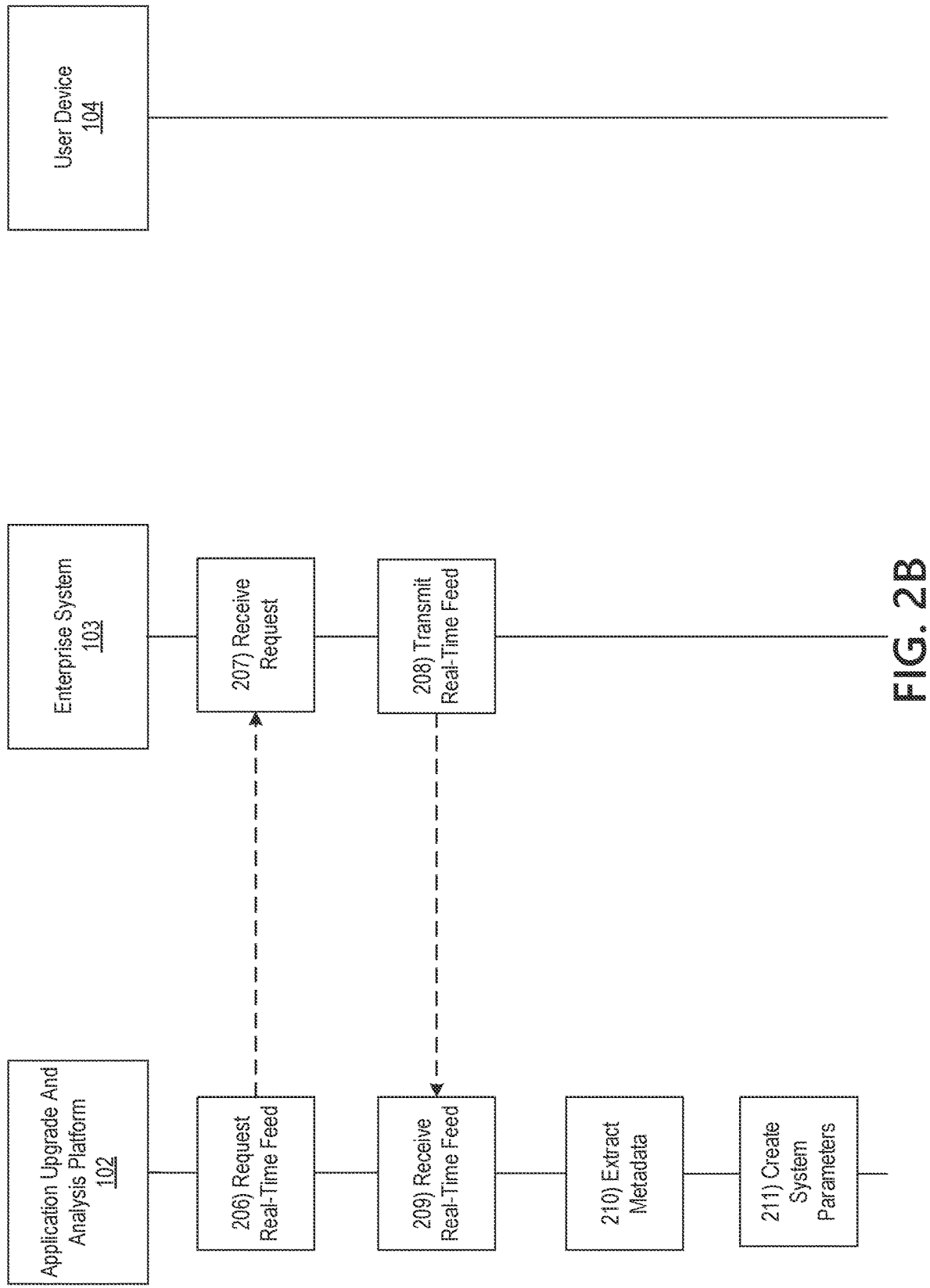

Referring to FIG. 2B, at step 206, application upgrade and analysis platform 102 may request a real-time feed from the enterprise system 103. In some instances, the real-time feed may include information relating to the status or operation of the enterprise system 103, metadata relating to the enterprise system 103, and/or the like (e.g., application-specific parameters, CPU utilization, available computing power, performance, memory, and/or other information). For example, application upgrade and analysis platform 102 may send the request to the enterprise system 103 while the second wireless data connection is established. The request may include information that, when received by the enterprise system 103, directs the enterprise system to send a real-time feed to the application upgrade and analysis platform 102.

At step 207, the enterprise system 103 may receive the request. For example, the enterprise system 103 may receive the request via the communication interface 113 and while the second wireless data connection is established. In some instances, in receiving the request, the enterprise system 103 may be directed by the application upgrade and analysis platform 102 to transmit a real-time feed of the enterprise system 103 to the application upgrade and analysis platform 102.

At step 208, the enterprise system 103 may transmit a real-time feed of the enterprise system 103 to the application upgrade and analysis platform 102. For example, enterprise system 103 may transmit the real-time feed while the second wireless data connection is established. In some instances, the enterprise system 103 may continuously transmit the real-time feed throughout any of the below steps without departing from the scope of the disclosure.

At step 209, the application upgrade and analysis platform 102 may receive the real-time feed of the enterprise system 103. For example, application upgrade and analysis platform 102 may receive the real-time feed while the second wireless data connection is established. In some instances, a virtual control machine (VCM) module 112a, that may include a first virtual control machine (VCM), may receive the real-time feed of the enterprise system 103.

Although the below steps are described sequentially, they may be performed in parallel by the application upgrade and analysis platform 102 without departing from the scope of the disclosure.

At step 210, the application upgrade and analysis platform 102 may extract metadata from the real-time feed of the enterprise system 103. In some instances, the metadata extraction may be performed by the first VCM. Additionally or alternatively, the metadata may be extracted by a root process automation (RPA) bot. In some instances, extracting the metadata may include extracting information relating to the enterprise system 103, such as the identity, version, related libraries, hardware, and software of the enterprise system 103. In some instances, the metadata may include the underlying aspects or characteristics of the enterprise system 103, such as the performance of the enterprise system 103, memory associated with the enterprise system 103, the central processing unit (CPU) utilization of the enterprise system 103, and/or the like. In some instances, the metadata may include information about particular applications within the enterprise system 103, and may further include the underlying libraries and dependencies of the applications. In some instances, the metadata may include information regarding the relations between the applications within the enterprise system 103, the performance of the enterprise system 103, the memory of the enterprise system 103, the CPU utilization of the enterprise system 103, and/or the like.

At step 211, the application upgrade and analysis platform 102 may create system parameters based on the metadata that was extracted in step 210. In some instances, the first VCM may create the system parameters. For example, a particular system parameter may be an entity that represents a particular characteristic that was extracted from the metadata of the enterprise system 103, such as the performance of the enterprise system 103, memory associated with the enterprise system 103, the CPU utilization of the enterprise system 103, and/or the like. In some instances, a system parameter may represent information about a particular application within the enterprise system. In some instances, system parameters may include information relating to the underlying libraries of an application. In some instances, the system parameters may include information about the relations between the applications within the enterprise system 103, the performance of the enterprise system 103, the memory of the enterprise system 103, the CPU utilization of the enterprise system 103, and/or the like.

Figure 2C:
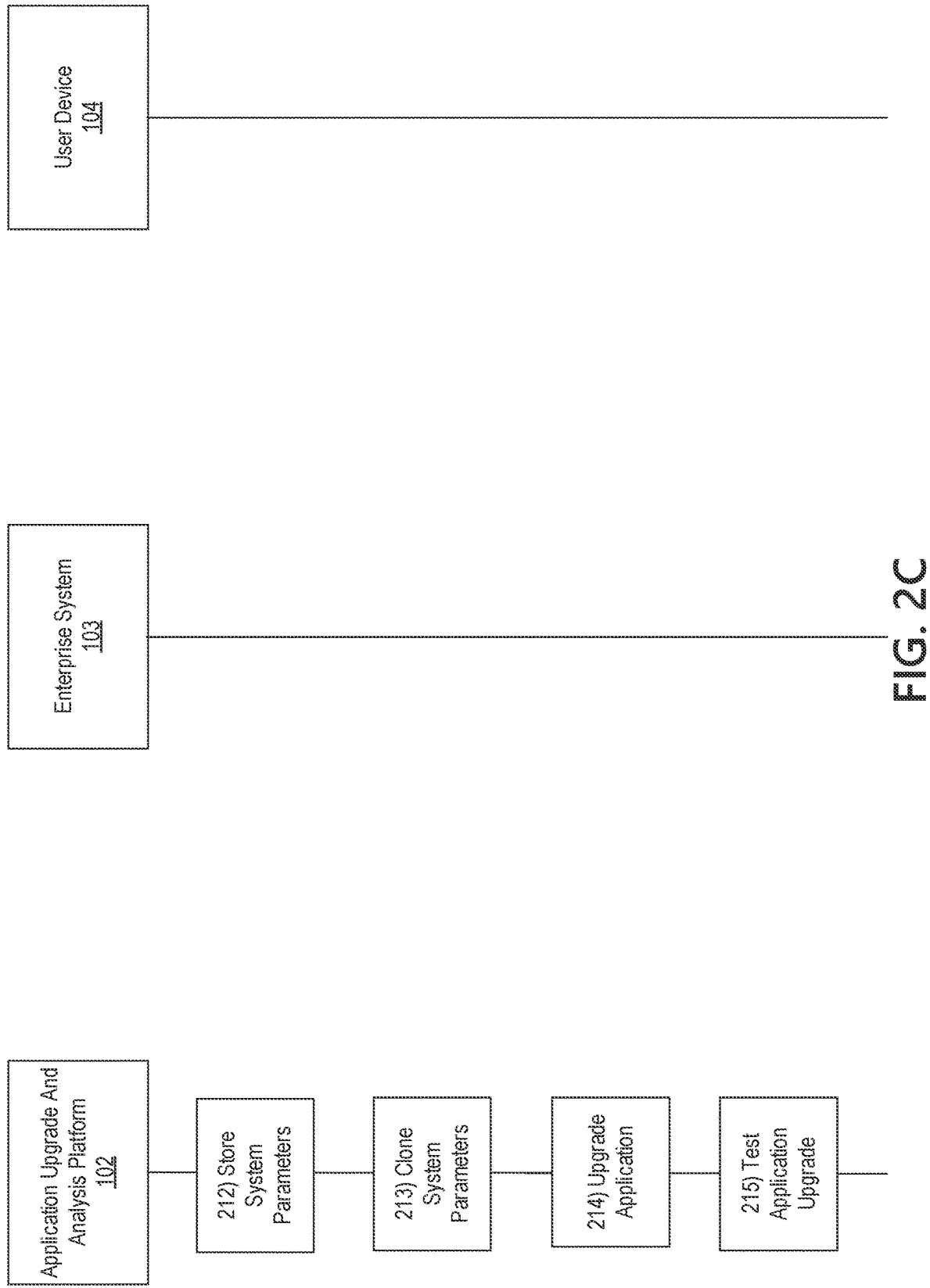

Referring to FIG. 2C, at step 212, application upgrade and analysis platform 102 may store the system parameters. In some instances, the system parameters may be stored in a graphical database.

At step 213, the application upgrade and analysis platform 102 may clone the system parameters. In some instances, the first VCM may clone the system parameters. For example, the cloned system parameters may be replicas of the various system parameters that were created in step 211, such as the performance of the enterprise system 103, memory associated with the enterprise system 103, the CPU utilization of the enterprise system 103, and/or the like. In some instances, the cloned system parameters may be replicas of system parameters such as particular applications within the enterprise system 103, that may further include the underlying libraries of the applications. In some instances, the cloned system parameters may be modified based on upgrading an application, which is discussed further below.

In cloning the system parameters at step 213, the application upgrade and analysis platform 102 may create a simulated version of the enterprise system 103. In some instances, the simulated version of the enterprise system 103 may continuously track the enterprise system 103 in real-time due to the real-time feed received in step 210.

At step 214, the application upgrade and analysis platform 102 may upgrade an application within the simulated version of the enterprise system 103. For example, a second VCM of the VCM module 112*a* may upgrade the application within the simulated version of the enterprise system 103. In some instances, the second VCM may perform the application upgrade using a copy of the application. In this way, the application upgrade that was requested by the user device 104 may be performed in a simulated, or virtual environment, within the application upgrade and analysis platform 102 without affecting the functioning of the enterprise system 103. In some instances, the application upgrade and analysis platform 102 may modify the cloned system parameters based on the application upgrade. For example, a cloned system parameter representing the application-to-be-upgraded may be replaced with the upgraded application. As a result, the application upgrade and analysis platform 102 may upgrade the application within the simulated version of the enterprise system 103.

At step 215, the application upgrade and analysis platform 102 may test the application upgrade. For example, the application upgrade and analysis platform 102 may use the second VCM to test how the upgraded application may have affected the simulated version of the enterprise system 103. Additionally or alternatively, an RPA bot may test the application upgrade. In some instances, the testing performed at step 216 may determine how the enterprise system 103 would have been affected had the application upgrade occurred within the enterprise system 103 rather than the simulated version of the enterprise system 103.

Additionally or alternatively, the application upgrade and analysis platform 102 may initialize executable instructions configured to test the application upgrade. In some instances, the instructions may be stored at the application upgrade and analysis platform 102, such as in memory 112. In some instances, the instructions may be stored at a computing device (i.e., enterprise system, user device 104), which the application upgrade and analysis platform 102 may access, using, for example, the first and/or second wireless data connection. The instructions, when executed, may direct the application upgrade and analysis platform 102 to test the application upgrade that has been requested by the user device 104.

In some instances, testing may refer to executing a plurality of test scenarios, or permutations, that may be performed by the application upgrade and analysis platform 102, in order to determine how the application upgrade may have affected other aspects of the simulated version of the enterprise system 103, such as the performance of the simulated version of enterprise system 103, memory associated with the simulated version of enterprise system 103, the CPU utilization of the simulated version of enterprise system 103, and/or the like.

Referring to FIG. 2D, at step 216, the application upgrade and analysis platform 102 may create virtual parameters. For example, a particular virtual parameter may be an entity, feature, object, and/or other information that represents a particular aspect or characteristic of the simulated version of the enterprise system 103, such as the performance of the simulated version of the enterprise system 103, memory associated with simulated version of the enterprise system 103, the CPU utilization of the simulated version of the enterprise system 103, and/or the like. In some instances, a virtual parameter may represent information about particular applications within the simulated version of the enterprise system 103, such as the upgraded application. In some instances, virtual parameters may include information relating to the underlying libraries of the applications within the simulated version of the enterprise system 103. In some instances, the virtual parameters may include information about the relations between the applications within the simulated version of the enterprise system 103, the performance of the simulated version of the enterprise system 103, the memory of the simulated version of the enterprise system 103, the CPU utilization of the simulated version of the enterprise system 103, and/or the like.

In some instances, virtual parameters may correspond to the system parameters, such as a virtual parameter representing the performance of the simulated version of the enterprise system 103 after the application has been upgraded within the simulated version of the enterprise system 103, and a corresponding system performance parameter that represents the performance of the enterprise system 103 without the application upgrade. The comparison between the value of the virtual performance parameter and the value of the system performance parameter may, for example, represent a difference in the performance of the simulated version of the enterprise system 103 after the application upgrade, and the enterprise system 103 without the application upgrade. In this way, the application upgrade and analysis platform 102 may simulate how the application upgrade would have affected the performance of the enterprise system 103 had the application been upgraded within the enterprise system 103 rather than the simulated version of the enterprise system 103. Various corresponding parameters, such as memory, CPU utilization, application-to-be-upgraded/upgrade application, and/or the like may be simulated in a similar manner. In this way, issues relating to the application upgrade may be simulated in a controlled environment rather than the enterprise system 103 itself.

At step 217, the application upgrade and analysis platform 102 may store the virtual parameters. For example, the virtual parameters may be stored in a graphical database. In some instances, the graphical database may be modified to store the virtual parameters with the system parameters that were previously stored in step 212. Because virtual parameters may have corresponding system parameters, a preexisting relationship may exist between the virtual parameters and the system parameters that may be graphically represented by the graphical database as a collection of system nodes and virtual nodes, which is discussed in greater detail below.

At step 218, the application upgrade and analysis platform 102 may create system nodes. For example, the graphical database may be configured to convert each of the system parameters that were previously stored into system nodes, such as an application node, a performance node, a memory node, a CPU utilization node, and/or the like. In some instances, a system node may be a graphical representation of a particular system parameter, and may be, for example, a hexadecimal entity including a static component, representing, i.e., the node's identity, such as the node being a performance node, and a dynamic component, such as the value of the performance node at a particular time. In some instances, the graphical database may link the system nodes together based on pre-existing relations between the system parameters.

At step 219, the application upgrade and analysis platform 102 may create virtual nodes. For example, the graphical database may be configured to convert each of the system virtual parameters that were previously stored into virtual nodes, such as a virtual application node, a virtual performance node, a virtual memory node, a virtual CPU utilization node, and/or the like. In some instances, a virtual node may be a graphical representation of a particular virtual parameter, and may be, for example, a hexadecimal entity including a static component, representing, i.e., the node's identity, such as the node being a virtual performance node, and a dynamic component, such as the value of the virtual performance node at a particular time. In some instances, the graphical database may link the virtual nodes together based on pre-existing relations between the virtual parameters.

Referring to FIG. 2E, at step 220, the application upgrade and analysis platform 102 may dynamically link the system nodes to the virtual nodes. For example, the graphical database may dynamically link a particular system node to a virtual node based on the correspondence between the system parameters and the virtual parameters, such as an application-to-be-upgraded node and a corresponding virtual upgraded application node, a performance node and a corresponding virtual performance node, a memory node and a corresponding virtual memory node, a CPU utilization node and a corresponding virtual CPU utilization node, and/or the like. In this way, the dynamic linking between the system nodes and the virtual nodes may detect any differences or changes relating to the application upgrade that was performed within the simulated version of the enterprise system 103 as compared to the enterprise system 103.

At step 221, the application upgrade and analysis platform 102 may detect errors based on the dynamic linking performed in step 220. For example, a dynamic link between a performance node and a virtual performance node may represent the difference between the performance of the simulated version of the enterprise system 103 after the application upgrade and the performance of the enterprise system 103 in which the application has not been upgraded. In this way, an error or issue with respect to the performance of the simulated version of the enterprise system 103 may be detected by the graphical database. Similar errors may be detected with respect to memory, CPU utilization, and/or the like.

For example, a dynamic link between an application-to-be-upgraded node and the upgraded application node may represent the difference between the application-to-be-upgraded running on the enterprise system 103 and the upgraded application running on the simulated version of the enterprise system 103. For example, the dynamic link may include a value corresponding to the discrepancy between its two connecting nodes, such as the application-to-be-upgraded node and the upgraded application node. In some instances, in upgrading the application, an error may be caused by, for example, a missing or incorrect version of a library that the upgraded application depends on, which may be detected by the graphical database.

At step 222, the application upgrade and analysis platform 102 may determine actions to correct the errors that were detected in step 221. For example, a third VCM of the VCM module 112a may send the errors from the graphical database to an AI engine to determine actions to correct the errors. Additionally or alternatively, an RPA bot may send the errors to the AI engine. In some instances, the third VCM may send information relating to the discrepancy between two nodes connected by a dynamic link, such as the application-to-be-upgraded node and the upgraded application node, which may be input into the AI engine in order to determine an action to correct an error that was identified by the graphical database. In some instances, the application upgrade and analysis platform 102 may configure the AI engine to identify and/or otherwise compute a confidence score, which may represent a level of confidence that a particular action will correct an identified error. In some instances, the confidence score may be a numerical value (e.g., 0.9). In some instances, the confidence score may be a percentage (e.g., 90%).

In some instances, the application upgrade and analysis platform 102 may display a graphical user interface similar to graphical user interface 505, which is illustrated in FIG. 5. For example, the application upgrade and analysis platform 102 may display information related to errors that were detected and proposed actions to correct the errors. For example, if the error was due to a missing library within the upgraded application, the AI engine may determine which particular library is missing and determine the particular missing library as the action to correct the error. Additionally or alternatively, if the error was due to a drop in performance after the application upgrade, the AI engine may determine that an incorrect or previous version of a library within the upgraded application to be the cause of the performance drop, and determine the correct or most recent version of the library as the action to correct the error. The AI engine may determine similar actions to correct identified errors relating to memory, CPU utilization, and/or the like.

At step 223, the application upgrade and analysis platform 102 may update the virtual nodes based on the actions that were identified by the AI engine. In some instances, actions that were previously determined by the AI engine in step 222 may be passed to the graphical database by the third VCM and used by the graphical database to modify the virtual nodes based on the actions. For example, a new library may be used to modify a virtual node that represents the upgraded application with the new library in place of the incorrect version. Additionally or alternatively, the virtual parameters may be updated to reflect similar changes.

Although the VCM Module 112a was described as having a first VCM, a second VCM, and a third VCM, the VCM Module 112a may be configured with more or less than three VCMs without departing from the scope of the present disclosure. Having multiple VCMs within a VCM module 112a may be advantageous due to the benefit of load balancing within the VCM module 112a, as well as efficiently allocating computing resources within the application upgrade and analysis platform 102.

Figure 2F:
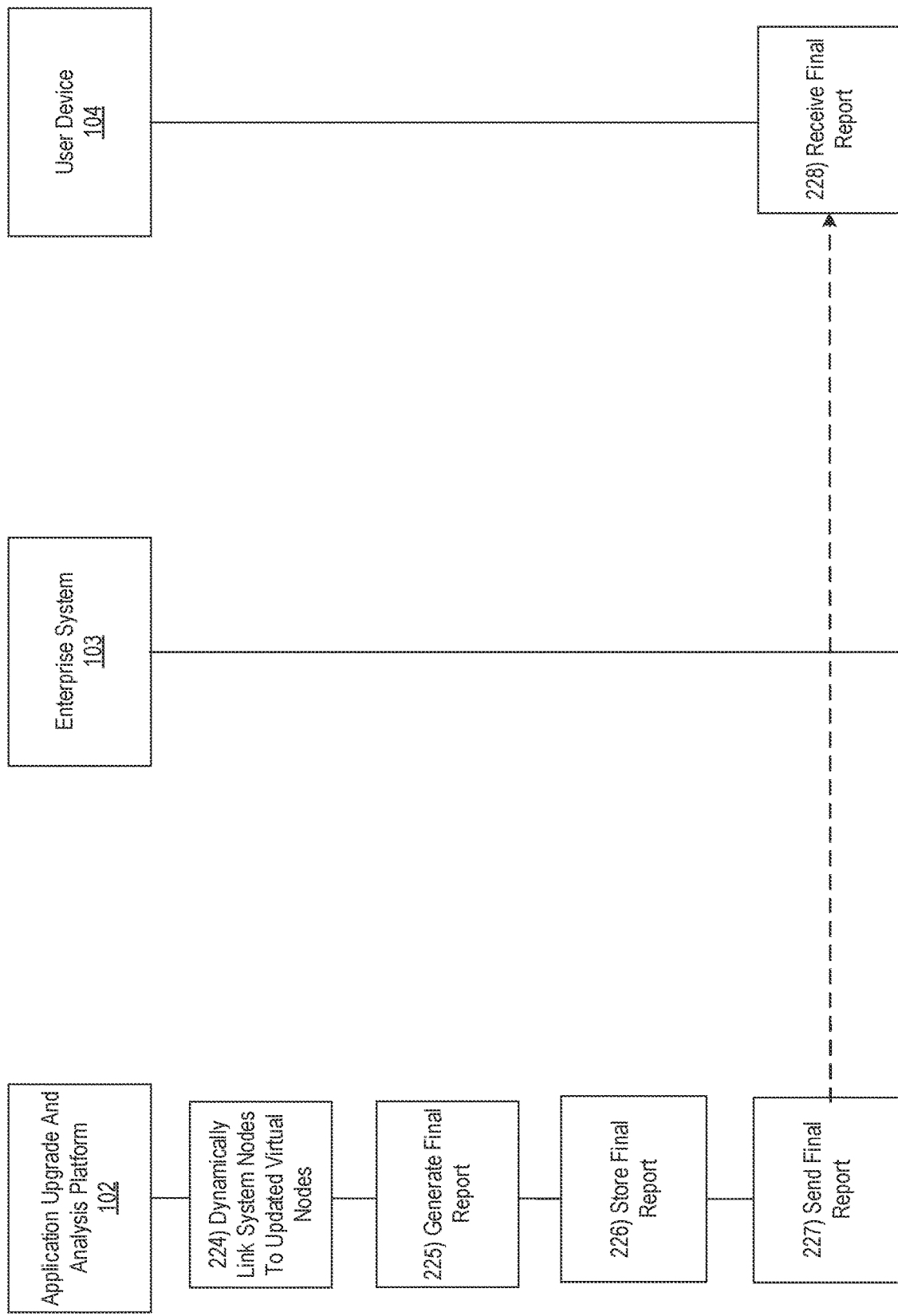

Referring to FIG. 2F, at step 224, the application upgrade and analysis platform 102 may dynamically link the system nodes to the updated virtual nodes. In some instances, the graphical database may determine if the previously identified errors were corrected by the actions based on the dynamic linking between the system nodes and the updated virtual nodes. This represents, for example, if the change to the simulated version of the enterprise system 103 fixes the errors based on the actions that were determined by the AI engine. For example, the application upgrade and analysis platform 102 may identify whether all discrepancies between the system nodes and the virtual nodes have been eliminated. In some instances, the graphical database may send a notification to the AI engine based on whether the actions corrected the errors. In some instances, if errors continue to persist, the application upgrade and analysis platform may return to step 222 to determine one or more additional actions to correct errors.

At step 225, the application upgrade and analysis platform 102 may generate a final report. In some instances, in generating the final report, the application upgrade and analysis platform 102 may include information about the error, the action that corrected the error, and/or other information. In some instances, in generating the final report, the application upgrade and analysis platform 102 may further include information about the application that was upgraded, the system parameters, the virtual parameters, the system nodes, the virtual nodes, the updated virtual nodes, the dynamic links between the system nodes and the virtual noes, and the dynamic links between the system nodes and the updated virtual nodes. In some instances, in generating the final report, the application upgrade and analysis platform 102 may further include information explaining in more detail any of the previously mentioned details. In some instances, in generating the final report, the application upgrade and analysis platform 102 may further include a graphical representation of the previously mentioned details.

At step 226, the application upgrade and analysis platform 102 may store the final report. In some instances, the final report may be stored in the AI engine. In some instances, the final report may be stored in the graphical database. In some instances, the application upgrade and analysis platform 102 may store the final report in memory associated with the application upgrade and analysis platform 102.

At step 227, the application upgrade and analysis platform 102 may send the final report to the user device 104. In some instances, application upgrade and analysis platform 102 may send the final report to the user device 104 via the communication interface 113 and while the first wireless data connection is established. Additionally or alternatively, an RPA bot may send the final report to the user device 104 via the communication interface 113 and while the second first wireless data is established. At step 228, the user device 104 may receive the final report. The final report may include one or more commands, that, when received by the user device 104, directs the user device 104 to display the final report.

In some instances, the user device 104 may determine whether to direct the application upgrade and analysis platform 102 to execute the application upgrade on the enterprise system 103 as well as send instructions causing the enterprise system 103 to execute the actions to correct the errors. In some instances, the enterprise system 103 may automatically upgrade the application and execute the actions to correct the errors within the enterprise system 103 without prior approval from the user device 104. In some instances, the application upgrade and analysis platform 102 may monitor the enterprise system 103 after the application upgrade and execution of the actions using, for example, the second wireless connection.

Figure 2G:
Figure 2G:
Figure 2G:
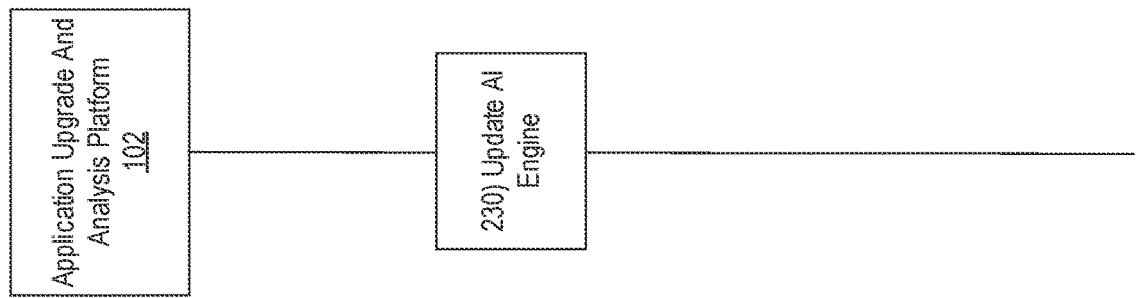

Referring to FIG. 2G, at step 229, based on or in response to the one or more commands directing the user device 104 to display the final report, the user device 104 may display the final report received at step 228. In some instances, the user device 104 may display a graphical user interface similar to graphical user interface 605, which is illustrated in FIG. 6. For example, the user device 104 may display that the errors that were previously detected have been corrected by the proposed actions with the application upgrade and analysis platform 102.

At step 230, the application upgrade and analysis platform 102 may update the AI engine. For example, the AI engine may be updated based on the outputs of steps 211, 215, 216, 218-224, and/or feedback received from the user device 104 and/or enterprise system 103. In doing so, the application upgrade and analysis platform 102 may dynamically and continuously update and/or otherwise refine the AI engine so as to increase accuracy of the AI engine over time. In some instances, the historical information used to train the AI engine in step 201 may further include the system parameters, the virtual parameters, the system nodes, the virtual nodes, the dynamic links between the system nodes and the virtual nodes, the dynamic links between the system nodes and the updated virtual nodes, the actions to correct the identified errors, and the determination whether the actions corrected the identified errors.

In some instances, the application upgrade and analysis platform 102 may update the AI engine using information that may include the identified errors, the actions to correct the identified errors, the level of confidence that a given action may successfully correct an error, and/or other information. In some instances, application upgrade and analysis platform 102 may update the AI engine based on the percentage of times actions successfully corrected corresponding errors with respect to a particular confidence score (e.g., 95% success rate at a confidence score of 0.9). Additionally or alternatively, the application upgrade and analysis platform 102 may update the AI engine based on the percentage of times actions unsuccessfully corrected corresponding errors with respect to a particular confidence score (e.g., 15% failure rate at a confidence score of 0.7). In some instances, the confidence score may be compared to an accuracy threshold, above which the AI engine may be updated, and below which, the AI engine may not be updated, in order to increase the accuracy of the AI engine over time, while taking into account the processing costs associated with updating the AI engine.

Figure 3:
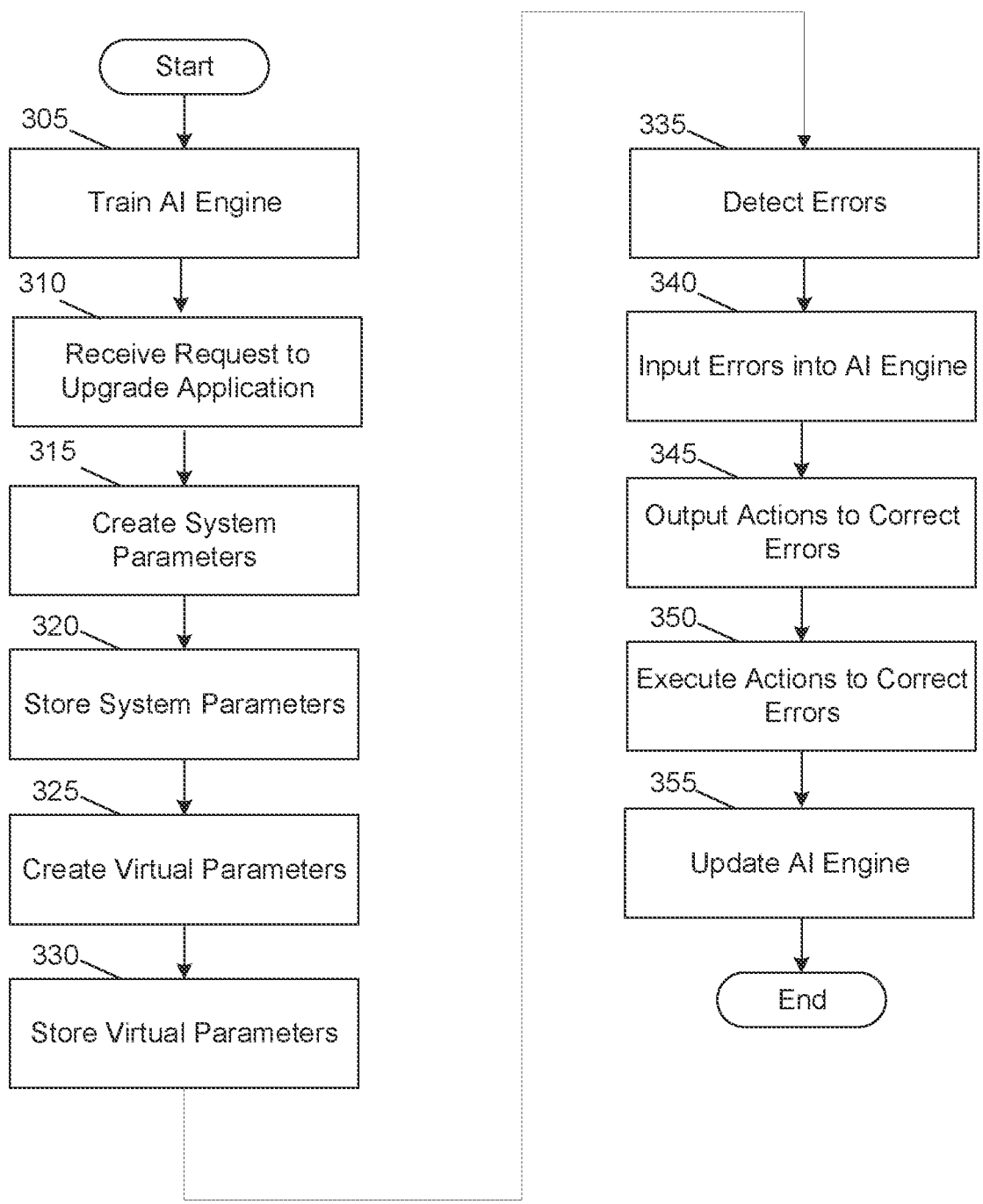
FIG. 3 depicts an illustrative method for implementing an AI supported graph enabled method to manage an application upgrade in accordance with one or more example embodiments.

FIG. 3 depicts an illustrative method for implementing an AI supported graph enabled method to manage upgrades for applications in accordance with one or more example embodiments. At step 305, a computing platform having at least one processor, a communication interface, and memory may train an AI engine using historical information. At step 310, the computing platform may receive a request to upgrade an application.

At step 315, the computing platform may create system parameters associated with the enterprise system 103. At step 320, the computing platform may store the system parameters in a graphical database. At step 325, the computing platform may create virtual parameters based on the upgrading of the application within a simulated version of the enterprise system 103. At step 330, the computing platform may store the virtual parameters.

At step 335, the computing platform may detect errors. At step 340, the computing system may input errors into an AI engine. At step 345, the AI engine may output actions to correct the errors. At step 350, the computing system may execute the actions to correct the errors. At step 355, the computing platform may update the AI engine.

Figure 4:
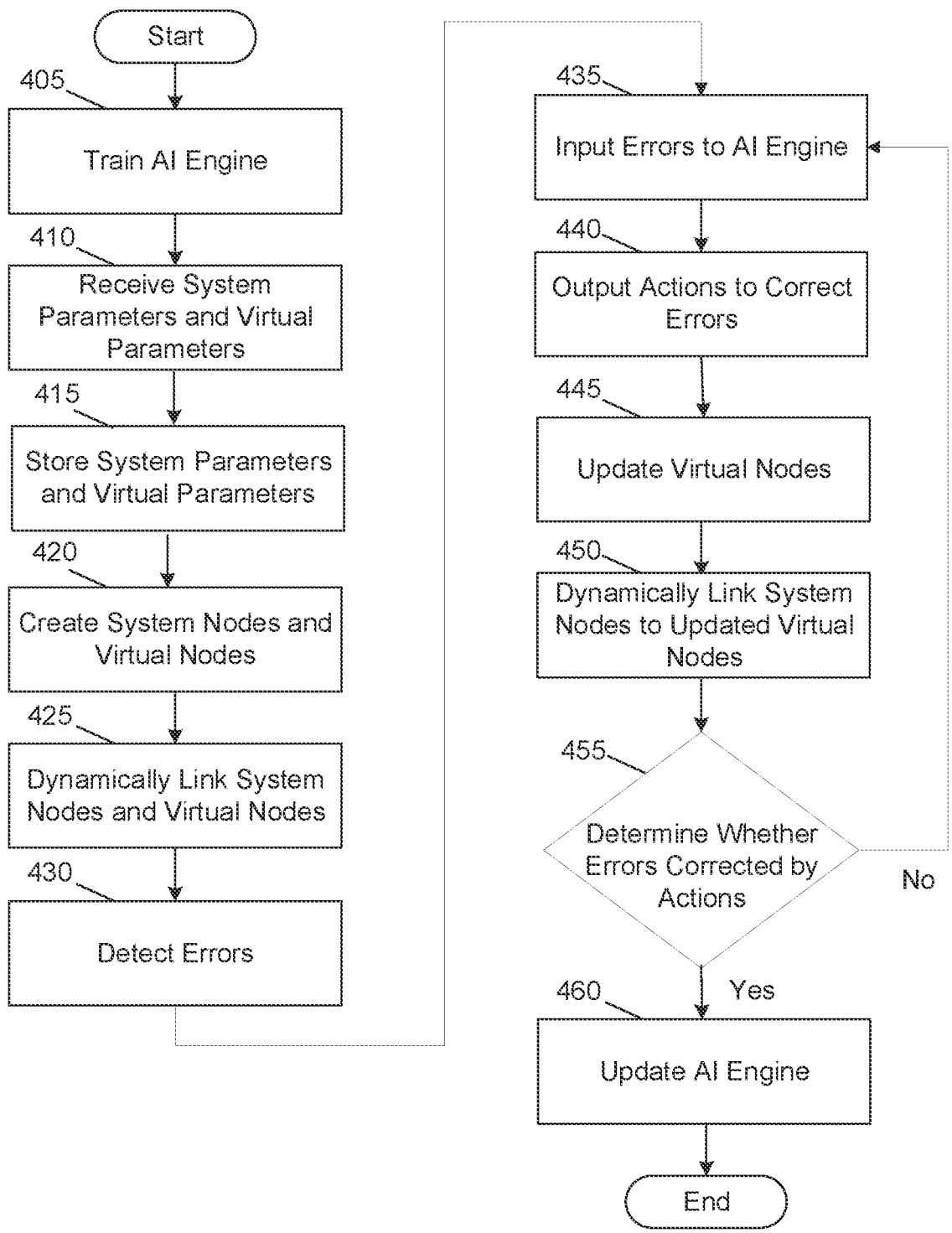
FIG. 4 depicts another illustrative method for implementing an AI support graph enabled method to manage an application upgrade in accordance with one or more example embodiments.

FIG. 4 depicts another illustrative method for implementing an AI supported graph enabled method to manage upgrades for applications in accordance with one or more example embodiments. At step 405, a computing platform having at least one processor, a communication interface, and memory may train an AI engine using historical information. At step 410, the computing platform may receive system parameters associated with the enterprise system 103 and virtual parameters based on the upgrading of the application within a simulated version of the enterprise system 103. At step 415, the computing platform may store the system parameters and the virtual parameters in a graphical database.

At step 420, the computing platform may create system nodes and virtual nodes based on the system parameters and the virtual parameters. At step 425, the computing platform may dynamically link the system nodes and the virtual nodes. At step 430, the computing platform may detect errors based on the dynamic linking performed in step 425.

At step 435, the computing system may input errors into an AI engine. At step 440, the AI engine may output actions to correct the errors. At step 445, the computing system may update the virtual nodes based on the actions to correct the errors. At step 450, the graphical database may dynamically link the system nodes to the updated virtual nodes. At step 455, the computing system may determine whether the errors were corrected by the actions. If the actions did not correct the errors or if new errors are detected, the computing system may proceed to step 435. If the actions corrected the errors and new errors are not detected, the computing system may proceed to step 460. At step 460, the computing platform may update the AI engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive system parameters of an enterprise system that represent characteristics of the enterprise system and virtual parameters of a simulated enterprise system, in which an application has been upgraded, that represent characteristics of the simulated enterprise system and correspond to the system parameters, wherein:
      each virtual parameter that represents a characteristic of the simulated enterprise system corresponds to a system parameter that represents a corresponding characteristic of the enterprise system; and
      differences between values of the virtual parameters and values of the corresponding system parameters represent differences between the characteristics of the simulated enterprise system and the corresponding characteristics of the enterprise system;
   store, in a graphical database, the system parameters and the virtual parameters;
   create system nodes based on the system parameters and virtual nodes based on the virtual parameters, wherein the system nodes are linked together based on relationships between the system parameters, and the virtual nodes are linked together based on relationships between the virtual parameters;
   dynamically link the system nodes to the virtual nodes based on the correspondence between the system parameters and the virtual parameters;
   detect, based on the dynamic linking between the system nodes and the virtual nodes, at least one error, wherein detecting the at least one error comprises identifying that at least one dynamic link indicates a discrepancy between a system node and a corresponding virtual node;
   input the at least one error into an AI engine to output at least one action to correct the at least one error;
   modify the graphical database by updating the virtual nodes based on the at least one action to correct the at least one error;
   dynamically link the system nodes to the updated virtual nodes;
   determine whether the at least one action corrected the at least one error based on the dynamic linking of the system nodes to the updated virtual nodes; and
   based on identifying that the at least one action corrected the at least one error, send one or more commands directing the enterprise system to upgrade the application within the enterprise system and execute the at least one action to correct the at least one error on the enterprise system, wherein sending the one or more commands causes the enterprise system to upgrade the application and execute the at least one action to correct the at least one error.

2. The computing platform of claim 1, wherein the memory stores additional computer-readable instructions that, when executed by the at least one processor, cause the computing platform to store, in the graphical database, the system nodes, the virtual nodes, the updated virtual nodes, the dynamic links between the system nodes and virtual nodes, and the dynamic links between the system nodes and the updated virtual nodes.

3. The computing platform of claim 1, wherein a first system node is an application-to-be-upgraded node and a first virtual node is a corresponding virtual upgraded application node, a second system node is a performance node and a second virtual node is a corresponding virtual performance node, a third system node is a memory node and a third virtual node is a corresponding virtual memory node, and a fourth system node is a central processing unit (CPU) utilization node and a fourth virtual node is a corresponding virtual CPU utilization node.

4. The computing platform of claim 3, wherein a first dynamic link is a link between the application-to-be-upgraded node and the corresponding virtual upgraded application node, a second dynamic link is a link between the performance node and the corresponding virtual performance node, a third dynamic link is a link between the memory node and the corresponding virtual memory node, and a fourth dynamic link is a link between the CPU node and the corresponding virtual CPU node.

5. The computing platform of claim 1, wherein the memory stores additional computer-readable instructions that, when executed by the at least one processor, cause the computing platform to:
   generate, using the graphical database, a graphical representation of the system nodes and the updated virtual nodes, and the dynamic linking of the system nodes to the updated virtual nodes; and
   output, to the AI engine, the graphical representation and an indication of whether or not the at least one action corrected the at least one error.

6. The computing platform of claim 1, wherein the memory stores additional computer-readable instructions that, when executed by the at least one processor, cause the computing platform to train the AI engine using the system nodes, the virtual nodes, the modified virtual nodes, the dynamic links between the system nodes and virtual nodes, the dynamic links between the system nodes and the updated virtual nodes, and the indication of whether or not the at least one action corrected the at least one error.

7. The computing platform of claim 1, wherein the memory stores additional computer-readable instructions that, when executed by the at least one processor, cause the computing platform to store, in the AI engine, the at least one action to correct the at least one error, and the indication of whether or not the at least one action corrected the at least one error.

8. The computing platform of claim 1, wherein the memory stores additional computer-readable instructions that, when executed by the at least one processor, cause the computing platform to output, to the AI engine, based on identifying that the at least one action did not correct the at least one error, a notification that the at least one action did not correct the at least one error.

9. The computing platform of claim 8, wherein the memory stores additional computer-readable instructions that, when executed by the at least one processor, cause the computing platform to send a report comprising the at least one error and the at least one action to correct the at least one error and one or more commands directing a user device to display the report, wherein sending the one or more commands directing the user device to display the report causes the user device to display the report.

10. The computing platform of claim 1, wherein the memory stores additional computer-readable instructions that, when executed by the at least one processor, cause the computing platform to monitor the enterprise system after the sending the one or more commands directing the enterprise system to upgrade the application within the enterprise system and execute the at least one action to correct the at least one error on the enterprise system.

11. The computing platform of claim 1, wherein a real-time state of the enterprise system is transmitted to the computing platform using a communication link.

12. A method comprising:
receiving system parameters of an enterprise system that represent characteristics of the enterprise system and virtual parameters of a simulated enterprise system in which an application has been upgraded, that represent characteristics of the simulated enterprise system and correspond to the system parameters, wherein:
each virtual parameter that represents a characteristic of the simulated enterprise system corresponds to a system parameter that represents a corresponding characteristic of the enterprise system; and
differences between values of the virtual parameters and values of the corresponding system parameters represent differences between the characteristics of the simulated enterprise system and the corresponding characteristics of the enterprise system;
storing, in a graphical database, the system parameters and the virtual parameters;
creating system nodes based on the system parameters and virtual nodes based on the virtual parameters, wherein the system nodes are linked together based on relationships between the system parameters, and the virtual nodes are linked together based on relationships between the virtual parameters;
dynamically linking the system nodes to the virtual nodes based on the correspondence between the system parameters and the virtual parameters;
detecting, based on the dynamic linking between the system nodes and the virtual nodes, at least one error, wherein the detecting the at least one error comprises identifying that at least one dynamic link indicates a discrepancy between a system node and a corresponding virtual node;
inputting the at least one error to an AI engine to determine at least one action to correct the at least one error;
modifying the graphical database by updating the virtual nodes based on the at least one action to correct the at least one error;
dynamically linking the system nodes to the updated virtual nodes;
determining whether the at least one action corrected the at least one error based on the dynamic linking of the system nodes to the updated virtual nodes; and
based on identifying that the at least one action corrected the at least one error, sending one or more commands directing the enterprise system to upgrade the application within the enterprise system and execute the at least one action to correct the at least one error on the enterprise system, wherein sending the one or more commands causes the enterprise system to upgrade the application and execute the at least one action to correct the at least one error.

13. The method of claim 12, further comprising storing, in the graphical database, the system nodes, the virtual nodes, the updated virtual nodes, the dynamic links between the system nodes and virtual nodes, and the dynamic links between the system nodes and the updated virtual nodes.

14. The method of claim 12, further comprising:
generating, using the graphical database, a graphical representation of the system nodes and the updated virtual nodes, and the dynamic linking of the system nodes to the updated virtual nodes; and
outputting, to the AI engine, the graphical representation and an indication of whether or not the at least one action corrected the at least one error.

15. The method of claim 12, further comprising training the AI engine using the system nodes, the virtual nodes, the updated virtual nodes, the dynamic links between the system nodes and virtual nodes, the dynamic links between the system nodes and the updated virtual nodes, and the indication of whether or not the at least one action corrected the at least one error.

16. The method of claim 12, further comprising storing, in the AI engine, the at least one action to correct the at least one error, and the indication of whether or not the at least one action corrected the at least one error.

17. The method of claim 12, further comprising, outputting, to the AI engine, based on determining that the at least one action did not correct the at least one error, a notification that the at least one action did not correct the at least one error.

18. The method of claim 12, further comprising monitoring the enterprise system after the sending the one or more commands directing the enterprise system to upgrade the application within the enterprise system and execute the at least one action to correct the at least one error on the enterprise system.

19. The method of claim 12, further comprising transmitting a real-time state of the enterprise system to a computing platform.

20. One or more non-transitory computer-readable media storing instructions that, when executed by a computing platform comprising at least one processor, a communication interface, and memory, cause the computing platform to:
receive system parameters of an enterprise system that represent characteristics of the enterprise system and virtual parameters of a simulated enterprise system in which an application has been upgraded, that represent characteristics of the simulated enterprise system and correspond to the system parameters, wherein:
each virtual parameter that represents a characteristic of the simulated enterprise system corresponds to a system parameter that represents a corresponding characteristic of the enterprise system; and
differences between values of the virtual parameters and values of the corresponding system parameters represent differences between values of the characteristics of the simulated enterprise system and values of the corresponding characteristics of the enterprise system;
store, in a graphical database, the system parameters and the virtual parameters;
create system nodes based on the system parameters and virtual nodes based on the virtual parameters, wherein the system nodes are linked together based on relationships between the system parameters, and the virtual nodes are linked together based on relationships between the virtual parameters;

dynamically link the system nodes to the virtual nodes based on the correspondence between the system parameters and the virtual parameters;

detect, based on the dynamic linking between the system nodes and the virtual nodes, at least one error, wherein detecting the at least one error comprises identifying that at least one dynamic link indicates a discrepancy between a system node and a corresponding virtual node;

input the at least one error to an AI engine to determine at least one action to correct the at least one error;

modify the graphical database by updating the virtual nodes based on the at least one action to correct the at least one error;

dynamically link the system nodes to the updated virtual nodes;

determine whether the at least one action corrected the at least one error based on the dynamic linking of the system nodes to the updated virtual nodes; and based on identifying that the at least one action corrected the at least one error, send one or more commands directing the enterprise system to upgrade the application within the enterprise system and execute the at least one action to correct the at least one error on the enterprise system, wherein sending the one or more commands causes the enterprise system to upgrade the application and execute the at least one action to correct the at least one error.

\* \* \* \* \*